H. Besse Water Gate

73159

PATENTED JAN 7 1868

Witnesses
W. C. Ashketter
Thos Inseht

Inventor
H. Besse
per ——— Attorney

United States Patent Office.

H. BESSE, OF DELAWARE, OHIO.

Letters Patent No. 73,159, dated January 7, 1868.

IMPROVEMENT IN AUTOMATIC WATER-GATE.

*The Schedule referred to in these Letters Patent and making part of the same.*

TO ALL WHOM IT MAY CONCERN:

Be it known that I, H. BESSE, of Delaware, in the county of Delaware, and State of Ohio, have invented a new and improved Automatic Water-Gate; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

This invention relates to a gate designed more particularly for farms, but which is available in other respects where similar conditions are to be fulfilled.

It consists of a gate provided with certain devices, which shall accomplish its opening and closing by the water of the stream which it spans, as will be hereinafter more fully set forth.

Figure 1:
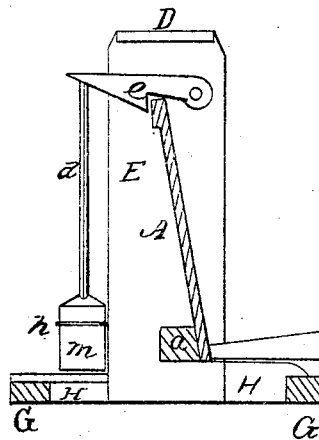
Figures 1 and 2 are cross-sections of the gate, through the part indicated by the line $x\bar{x}'$, fig. 2.
Figure 2:
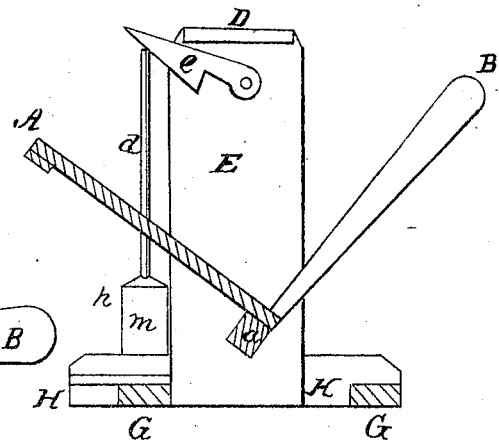
Figure 3:
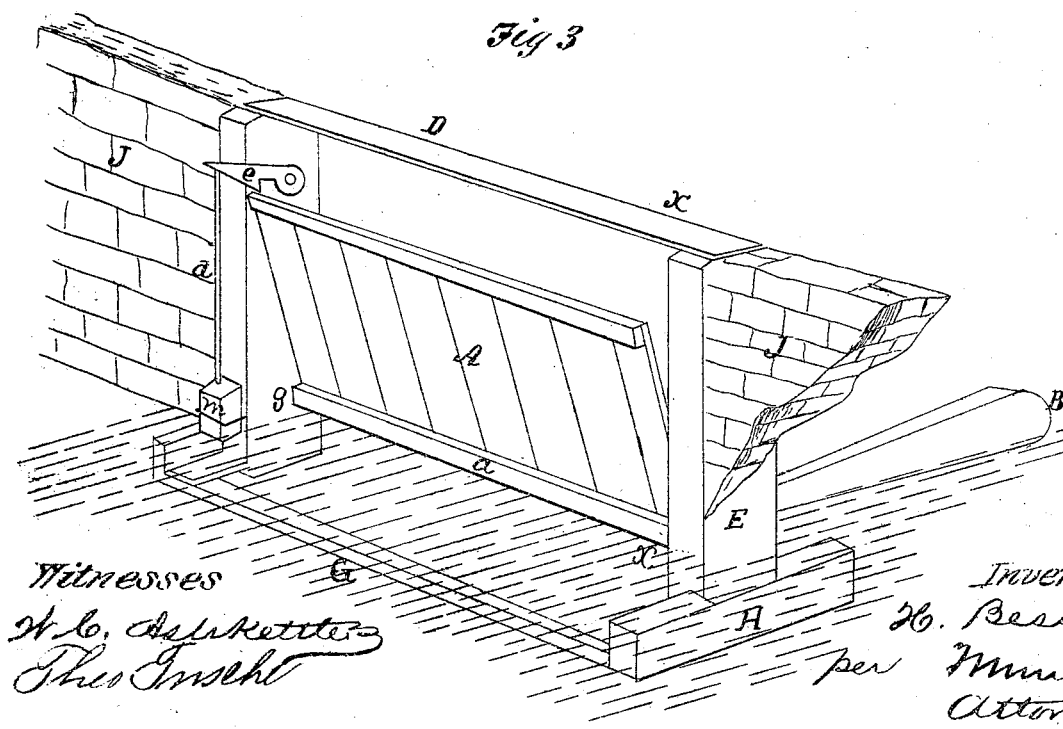
Figure 3 is a perspective view of the gate.

In the drawings, A is the gate, composed of short plank, nailed to a piece of square timber, $a$, which latter has its ends reduced and made circular, for the purpose of fitting into holes in the posts E, near the bottoms of the same, as shown at $g$, fig. 3, thus providing pivots or centres, upon which the gate turns in opening or closing. G are mud-sills, connecting the bases H of the posts E, and which mud-sills and bases are placed in the bed of the stream, below the bottom surface of the same, so that the water shall pass over them without obstruction.

To the bottom timber $a$ of the gate proper is secured a projecting float, B, of sufficient bulk to act both as a float and a weight, in operating the gate. This float may be shaped as shown in the drawing, and should be of some buoyant wood. It projects from the gate at an angle of about one hundred and ten degrees from the same, so that, when the gate is depressed horizontally in the bed of the stream, the said float will not be vertical, and, therefore, likely to descend by its own weight, when the water has subsided which raised it and depressed the gate.

This float lies against the current, or up stream, and when the said stream is swollen, as in a freshet, the float is raised by the water, which acts both to buoy it up and to press against the gate, at one and the same time, whereby the gate is borne down horizontally, thus permitting the water to pass over it unobstructed, and thereby preventing overflow and its attendant damages, as also the probable sweeping away of the gate.

A latch, $e$, is pivoted to one of the posts, and connected, by a rod, $d$, with a float, $m$, which latter is simply a block of buoyant wood, having a vertical motion, within a large wire strap, $h$, attached to one of the posts. When the water of the stream commences to rise, the float-block $m$ is buoyed up with it, and, by means of its rod, $d$, lifts the latch $e$, and prepares the gate for being opened by the rising water, as before described.

The abutments J may be of stone or wood, as desired, and are simply the terminations of a fence or wall leading to the gate.

The float B should be so placed as to be in contact with one of the posts, E, when the former is raised, to prevent drift-wood or twigs from getting between it and the post, and thereby preventing its proper action. A plank, D, forms part of the gate-frame, and serves as a foot-bridge, but may be omitted, as also the posts E, bases H, and mud-sills G, the gate merely, with its float B, being set into stone abutments, to one of which the latch $e$ and its float, $m$, would also be secured, to operate as before described.

If the stream is wide enough to require it, two or more gates may be used, their action being identical with that as above set forth. The bottom timber $a$ should be just above the low-water mark.

I have thus provided a gate which shall serve as a panel or panels of fence in crossing a farm-stream, when the same is within its banks, and so latched that stock cannot open it, but which will automatically open and close by the rise or fall of the water of the stream, and thus protect itself from damages by the increased volume of water, or of drift-wood borne thereon, and also prevent the overflow of the contiguous locality. It is simple, cheap, efficient, and durable.

I claim as new, and desire to secure by Letters Patent—

1. A water-gate, A, pivoted at or near its lower margin, and provided with a projecting float, B, all substantially as shown and described, and operating as and for the purpose set forth.

2. The latch $e$, or other equivalent device, operated by a float, $m$, or other equivalent device, substantially as shown and described, and in combination with the water-gate A, all as and for the purpose set forth.

H. BESSE.

Witnesses:
T. RODNEY SMITH,
LEONIDAS PIPER.